US010138999B2

(12) United States Patent
Yamada

(10) Patent No.: US 10,138,999 B2
(45) Date of Patent: Nov. 27, 2018

(54) SHIFT RANGE CONTROL APPARATUS

(71) Applicant: DENSO CORPORATION, Kariya, Aichi-pref. (JP)

(72) Inventor: Jun Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/492,288

(22) Filed: Apr. 20, 2017

(65) Prior Publication Data
US 2017/0307072 A1 Oct. 26, 2017

(30) Foreign Application Priority Data
Apr. 26, 2016 (JP) .................................. 2016-88292

(51) Int. Cl.
| H02K 29/10 | (2006.01) |
| H02P 25/08 | (2016.01) |
| F16H 61/32 | (2006.01) |
| F16H 61/24 | (2006.01) |
| H02K 19/10 | (2006.01) |
| H02P 6/16 | (2016.01) |
| H02P 27/08 | (2006.01) |
| H02P 6/24 | (2006.01) |
| H02P 6/30 | (2016.01) |
| H02K 1/27 | (2006.01) |
| H02K 7/116 | (2006.01) |
| H02K 1/14 | (2006.01) |

(52) U.S. Cl.
CPC ............ *F16H 61/32* (2013.01); *F16H 61/24* (2013.01); *H02K 1/2753* (2013.01); *H02K 7/116* (2013.01); *H02K 19/10* (2013.01); *H02P 6/16* (2013.01); *H02P 6/24* (2013.01); *H02P 6/30* (2016.02); *H02P 27/08* (2013.01); *F16H 2061/247* (2013.01); *F16H 2061/326* (2013.01); *H02K 1/14* (2013.01)

(58) Field of Classification Search
CPC ............... F16H 61/32; F16H 2061/247; F16H 2061/326; H02K 11/215; H02P 25/0805
USPC ........................................................ 318/254.1
See application file for complete search history.

(56) References Cited

U.S. PATENT DOCUMENTS

| 4,019,107 A * | 4/1977 | Dixon .................... H02P 7/2985 318/432 |
| 4,094,385 A * | 6/1978 | Maeda ...................... B66B 1/50 187/291 |
| 4,277,735 A * | 7/1981 | Okuyama ...................... 318/766 |

(Continued)

FOREIGN PATENT DOCUMENTS

JP 2004-308848 11/2004

*Primary Examiner* — Bickey Dhakal
*Assistant Examiner* — Gabriel Agared
(74) *Attorney, Agent, or Firm* — Nixon & Vanderhye P.C.

(57) ABSTRACT

A control circuit switches over a shift range by controlling driving of a motor to rotationally drive a detent plate. A current detection circuit detects a current value corresponding to a driving current supplied to drive the motor. A current increase check part performs check processing to check whether the current value detected by the current detection circuit has increased. A motor rotation stop part stops rotation of the motor when the current increase check part determines that the current has increased. A reverse driving part reverses the rotation direction of the motor and rotationally drives the motor after stopping of the motor by the motor rotation stop part.

11 Claims, 6 Drawing Sheets

(56) References Cited

U.S. PATENT DOCUMENTS

| | | | | |
|---|---|---|---|---|
| 5,469,215 A | * | 11/1995 | Nashiki | H02P 6/10 318/432 |
| 5,574,349 A | * | 11/1996 | Oh | G11B 15/467 318/601 |
| 2003/0222617 A1 | * | 12/2003 | Nakai | F16H 61/32 318/701 |
| 2007/0293992 A1 | * | 12/2007 | Kuwahara | F02D 41/1497 701/1 |
| 2011/0238272 A1 | * | 9/2011 | Kato | B60W 10/06 701/55 |
| 2014/0039742 A1 | * | 2/2014 | Tanaka | B60L 11/007 701/22 |
| 2014/0145665 A1 | * | 5/2014 | Shouji | B60L 15/025 318/503 |
| 2016/0118916 A1 | * | 4/2016 | Gohara | H02P 6/008 318/400.13 |

* cited by examiner

SHIFT RANGE CONTROL APPARATUS

CROSS REFERENCE TO RELATED APPLICATION

The present application is based on Japanese patent application No. 2016-088292 filed on Apr. 26, 2016, the whole contents of which are incorporated herein by reference.

FIELD

The present disclosure relates to a shift range control apparatus.

BACKGROUND

A conventional shift range control apparatus switches over a shift range by controlling a motor of a shift range switchover device in response to a shift range switchover request from a driver. For example, in a shift range switchover device disclosed in JP 2004-308848A, a switched reluctance motor (SR motor) is used as a motor as a drive power source. The SR motor, which does not use permanent magnets, is simple in structure.

A driven torque of the SR motor is, however, small, when no power is supplied. For this reason, in the shift range switchover device, when power supply to the SR motor is stopped under a state that a roller of a detent spring provided as a detent mechanism is located near a center of a recessed part of the detent plate, the roller is easily placed in position in the center of the recessed part of the roller by a pushing force of the detent spring. Thus the detent plate is placed in position relatively easily.

A motor such as a DC brushless motor, which uses permanent magnets, has a better response characteristic than the SR motor but its driven torque under no power supply is larger. For example, the SR motor of the shift range switchover device is replaced with a DC motor, it is possible to improve the response characteristic but probably not possible to place the roller in position to the recessed part by the pushing force of the detent spring when the power supply to the motor is stopped under the state that the roller of the detent spring is near the recessed part of the detent plate. As a result, the detent plate is likely to be not positioned with high accuracy.

SUMMARY

It is therefore an object to provide a shift range control apparatus, which is capable of positioning a detent plate with high accuracy.

According to one aspect, a shift range control apparatus is provided to switch over a shift range by controlling a shift range switchover device, which includes a motor, a detent plate and a detent spring. The motor has a motor shaft for outputting torque. The detent plate includes a detent shaft, which is connected to the motor shaft to receive the torque from the motor, a plate part, which is formed to extend from the detent shaft in a radially outward direction in a plate shape, and plural recessed parts formed at an outer peripheral part of the plate part. The detent spring includes a roller, which is pushed to the outer peripheral part of the plate part, the roller restricts the detent plate from rotation and fixes the range position, when fitted in the recessed part. The shift range control apparatus comprises a current detection part, a current increase check part, a motor rotation stop part and a reverse driving part. The current detection part detects a current value, which corresponds to a driving current supplied to drive the motor. The current increase check part checks whether the current value detected by the current detection part increased. The motor rotation stop part stops rotation of the motor when the current increase check part determines that the current value has increased. The reverse driving part rotationally drives the motor by reversing a rotation direction of the motor after the motor is stopped from rotation by the rotation stop part.

DETAILED DESCRIPTION OF THE EMBODIMENT

Figure 1:
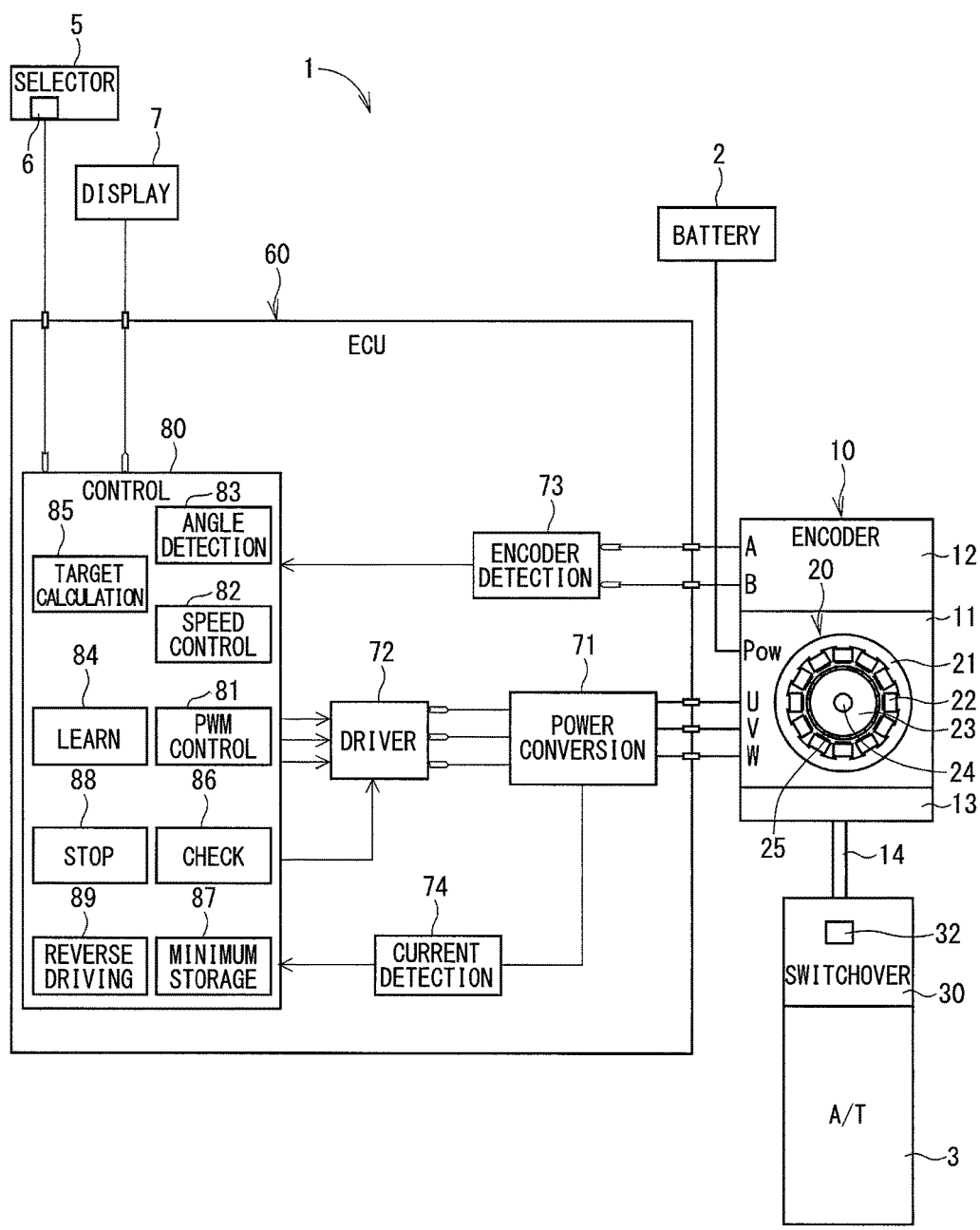
FIG. 1 is a schematic diagram showing a shift range control apparatus according to a first embodiment and a shift-by-wire system using the shift range control apparatus.

A shift range control apparatus will be described with reference to plural embodiments shown in the accompanying drawings. Substantially the same structural parts are designated with the same reference numerals and signs among plural embodiments thereby to simplify description.

First Embodiment

Referring first to FIG. 1, a shift-by-wire system, which uses a shift range control apparatus according to a first embodiment, is designated with reference numeral 1.

The shift-by-wire system 1 includes a shift range switchover device 30, an electronic control unit (ECU) 60, which is a shift range control apparatus, and the like. The shift-by-wire system 1 is mounted on a vehicle together with an automatic transmission (A/T) 3, for example, to switchover a shift range of the automatic transmission 3 via by-wire control by driving an actuator 10 of the shift range switchover device 30 in response to a command from a driver of the vehicle. The actuator 10 includes a housing 11, a motor 20, an encoder 12, a reduction device 13, an output shaft 14 and the like. The motor 20 is a DC brushless motor, which is for example a three-phase driven type. The motor 20 includes a stator 21, coils 22, a rotor 23, a motor shaft 24, magnets 25 and the like.

The stator 21 is formed in a ring shape by stacking plural iron plates, for example, and accommodated in a manner fixed to an inside wall of the housing 11. The stator 21 has plural salient poles, which are spaced apart equi-angularly in a circumferential direction and protruded in a radially inner direction. The coils 22 are wound about the salient poles of the stator 21. Each coil 22 corresponds to either one of plural phases (U-phase, V-phase and W-phase) of the motor 20. The rotor 23 is formed in a disk shape by stacking plural iron plates for example and provided rotatably in the stator 21.

The motor shaft 24 is fixed to the rotor 23 in the center of the rotor 23 and rotatable with the rotor 23. The motor shaft 24 is supported rotatably by the housing 11. The rotor 23 is thus rotatable with the motor shaft 24 inside the stator 21. The magnets 25 are fixed to an outer wall of the rotor 23 in a manner to face the salient poles of the stator 21. The magnets 25 are provided in a circumferential direction of the rotor 23 to provide opposite magnetic poles (N-pole and S-pole) alternately. By switching over current supply to the coil 22 of each phase, the stator 21 generates a rotating magnetic field to rotate the rotor 23. Since the motor 20 is the DC brushless motor as described above, it has a relatively high response characteristic. The motor 20 thus rotates with power supply from a battery 2 provided as an electric power source of the vehicle.

The ECU 60 controls driving of the motor 20 by switching over power supply from the battery 2 to the coil 22 of each phase.

The encoder 12 is provided in the housing 11 of the actuator 10. The encoder 12 is formed of a magnet, a magnetism detecting Hall IC and the like. The magnet is rotatable with the rotor 23. The Hall IC is mounted on a substrate, which is fixed to the housing 11, and located to face the magnet for detecting passing of a magnetic flux generating part of the magnet. The encoder 12 outputs an A-phase pulse signal and a B-phase pulse signal in correspondence to change in a rotation angle of the motor 20 (rotor 23). The encoder 12 is an incremental type encoder.

The reduction device 13 transfers rotation of the motor 20 to the shift range switchover device 30 after reducing a rotation speed of the motor shaft 24. The shift range switchover device 30 transfers a rotary driving force outputted from the reduction device 13 to a manual valve 4 and a parking lock mechanism 50, which are shown in FIG. 2.

Figure 2:
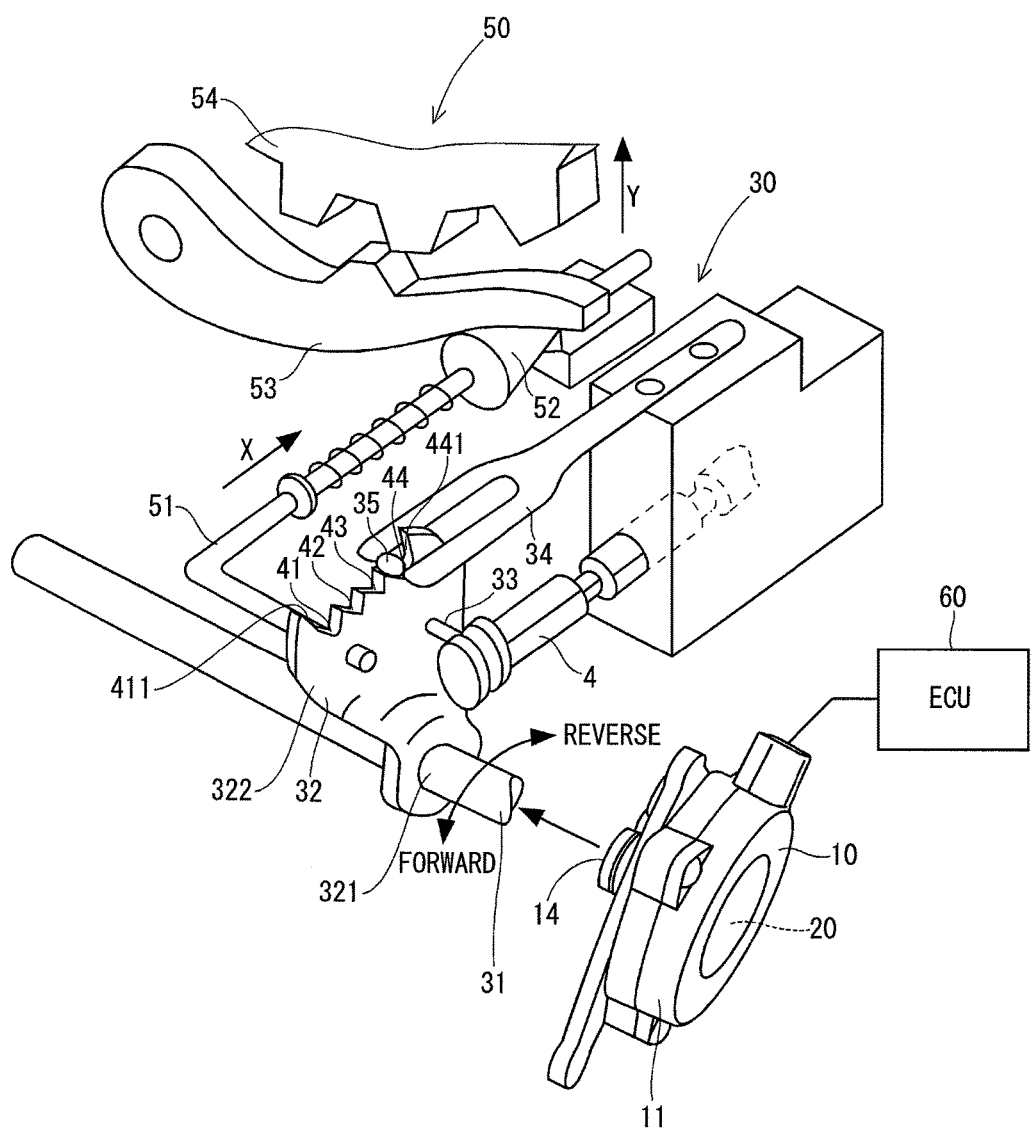
FIG. 2 is a perspective view showing a shift range switchover device, to which the shift range control apparatus according to the first embodiment is applied.
Figure 3:
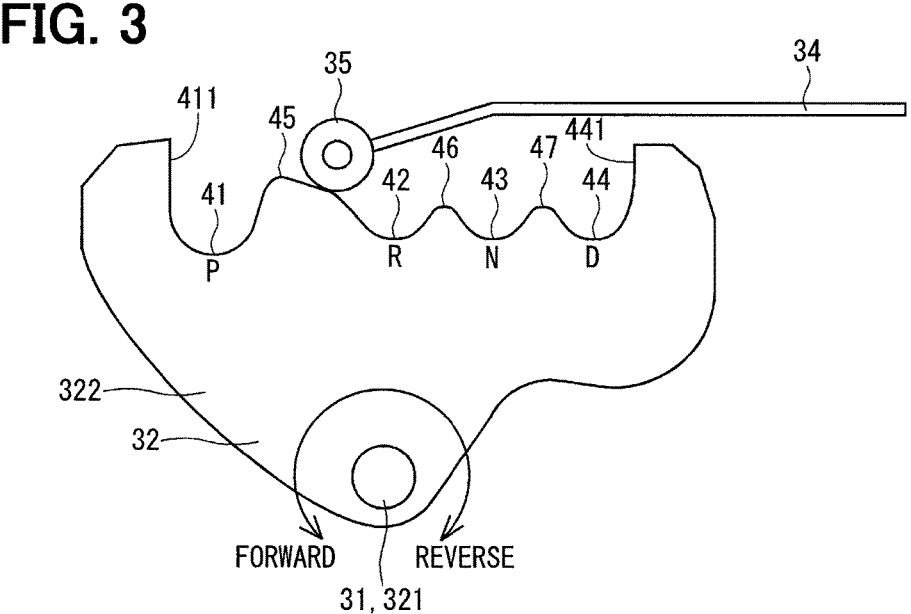
FIG. 3 is a schematic view showing a driven target of a motor of the shift range switchover device shown in FIG. 2.

As shown in FIG. 2, the shift range switchover device 30 includes the actuator 10, a manual shaft 31, a detent plate 32, which is a driven target, a detent spring 34 and the like. The manual shaft 31 is connected to the output shaft 14 of the actuator 10 and rotationally driven by a rotary torque of the motor 20. The detent plate 32 includes a detent shaft 321, a plate part 322, recessed parts 41, 42, 43, 44 and protruded parts 45, 46 and 47, which are shown in FIG. 3.

The detent shaft 321 is formed coaxially and integrally with the manual shaft 31. The torque of the actuator 10, that is, motor 20, is thus applied to the detent shaft 321 through the manual shaft 31. The detent shaft 321 is therefore rotationally driven with the manual shaft 31 by the torque transferred from the motor 20. Since the motor shaft 24 and the detent shaft 321 are connected through the reduction device 13 and the output shaft 14, a certain backlash exists between the motor shaft 24 and the detent shaft 321.

The plate part 322 is formed integrally with the detent shaft 321 and in a generally fan shape, which extends in a radially outward direction from the detent shaft 321. The plate part 322 is thus rotationally driven with the manual shaft 31 and the detent shaft 321 by the motor 20.

A pin 33 is fixed to the plate part 322 in a manner to protrude in generally parallel with the manual shaft 31. The pin 33 is connected to the manual valve 4. As a result, when the detent plate 32 rotates with the manual shaft 31, the manual valve 4 moves reciprocally in an axial direction. That is, the shift range switchover device 30 converts the rotary driving force of the actuator 10 to a linear movement and transfers it to the manual valve 4.

The recessed parts 41, 42, 43 and 44 are formed to be concave from an outer peripheral part toward the detent shaft 321. The recessed part 41 is formed at one circumferential side of the detent plate 32. The recessed part 44 is formed in the other circumferential side of the detent plate 32. The recessed parts 42 and 43 are formed between the recessed part 41 and the recessed part 44. The protruded part 45 is formed between the recessed part 41 and the recessed part 42. The protruded part 46 is formed between the recessed part 42 and the recessed part 43. The protruded part 47 is formed between the recessed part 43 and the recessed part 44.

In the first embodiment, the recessed parts 41 to 44 are formed in correspondence to different shift ranges of the automatic transmission 3. Specifically, the recessed part 41 is formed in correspondence to a parking range (P-range, P). The recessed part 42 is formed in correspondence to a reverse range (R-range, R). The recessed part 43 is formed in correspondence to a neutral range (N-range, N). The recessed part 44 is formed in correspondence to a drive range (D-range).

The detent spring 34 is formed resiliently and has a roller 35 as a restricting part at its longitudinal end. The detent spring 34 normally biases the roller 35 toward the detent shaft 321. Thus the roller 35 is pressed to the outer peripheral part of the plate part 322.

When a certain rotary force is applied from the motor 20 to the detent plate 32 in the rotation direction through the manual shaft 31, the roller 35 overrides one of the protruded parts 45, 46 and 47 formed between the recessed parts 41, 42, 43 and 44 and moves to the adjacent one of the recessed part 41, 42, 43 or 44. By thus rotating the manual shaft 31 by the actuator 10, the axial position of the manual valve 4 and a state of the parking lock mechanism 50 are varied thereby to switchover the shift range of the automatic transmission 3. When the roller 35 rides over each of the protruded parts 45, 46 and 47, the detent spring 34 resiliently deforms. At this time, the roller 35 passes the recessed part 41, 42, 43 or 44 and the protruded parts 45, 46 and 47 while rolling.

When the roller 35 fits in any one of the recessed parts 41, 42, 43 and 44 and restricts the detent plate 32 from rotating, the axial position of the manual valve 4 and the state of the parking lock mechanism 50 are fixed. Thus the shift range of the automatic transmission 3, that is, a range position is fixed. As described above, the detent plate 32 and the roller 35 operate as a detent mechanism.

In the first embodiment, a direction of rotation of the output shaft 14 of the actuator 10, which switches over the shift range from the P-range side to the R-range, N-range and D-range side as shown in FIG. 2, is assumed to be a forward rotation direction. A direction of rotation of the output shaft 14 of the actuator 10, which switches over the shift range from the D-range side to the N-range, R-range and P-range side, is assumed to be a reverse rotation direction.

As shown in FIG. 3, the recessed part 41, which corresponds to the P-range, has a P-wall 411, which is opposite to the protruded part 45. The recessed part 44, which corresponds to the D-range, has a D-wall 441, which is opposite to the protruded part 47. The P-wall 411 and the D-wall 441 are formed generally in parallel to each other and higher than the protruded parts 45, 46 and 47. For this reason, even when the detent plate 32 rotates in the reverse rotation direction, the roller 35 is not allowed to pass over the P-wall 411 and maintained in contact with the P-wall 411 thereby restricting the rotation of the detent plate 32 in the reverse rotation direction. In the similar manner, even when the detent plate 32 rotates in the forward rotation direction, the roller 35 is not allowed to pass over the D-wall 441 and maintained in contact with the D-wall 441 thereby restricting the rotation of the detent plate 32 in the forward rotation direction. Thus, a movable range of the detent plate 32 corresponds to a relatively movable range of the roller 35 between the P-wall 411 and the D-wall 441.

FIG. 2 shows the state of the parking lock mechanism 50 in a case that the shift range is the D-range, that is, a range other than the P-range. In this state, a parking gear 54 is not locked by a parking lock pawl 53. As a result, rotation of wheels of the vehicle is not restricted. When the output shaft 14 of the actuator 10 is rotated in the reverse rotation direction from this state, a rod 51 fixed to the detent plate 32 is pushed through the detent plate 32 in an arrow direction X shown in FIG. 2. A tapered part 52 formed at the longitudinal end of the rod 51 pushes up the parking lock pawl 53 in an arrow direction Y shown in FIG. 2. As a result, the parking lock pawl 53 is meshed with the parking gear 54 to lock the parking gear 54. Thus the rotation of the wheels of the vehicle is restricted. Under this state, the roller 35 of the detent spring 34 remains fitted in the recessed part 41 of the detent plate 32. That is, the roller 35 is positioned in the center of the recessed part 41 and the actual range of the automatic transmission 3 is set in the P-range.

The ECU 60 will be described next in detail. The ECU 60 is a small-sized computer, which includes a central processing unit (CPU) as an arithmetic operation unit, a RAM and a ROM as memories, other circuits and input/output circuits. The ECU 60 operates to control various apparatuses and devices by execution of various programs stored in the ROM and the like in accordance with sensor signals outputted from various sensors mounted on the vehicle and various data stored in the ROM and RAM. The ECU 60 is connected electrically to the battery 2, which is the power supply source in the vehicle, to operate with electric power supplied from the battery 2. Each processing of the ECU 60 may be software processing performed by execution of programs pre-stored in the memory such as the ROM or hardware processing performed by dedicated electronic circuits.

As shown in FIG. 1, the ECU 60 includes a power conversion circuit 71, a driver circuit 72, and encoder detection circuit 73, a current detection circuit 74, a control circuit 80 and the like. The power conversion circuit 71 is an inverter, for example, which includes plural switching elements such as MOSFETs. In the first embodiment, six switching elements are used. Two of the six switching pairs form one pair of switching elements. That is, the switching elements provide three switching element pairs. The three switching element pairs are provided in correspondence to three phases of coils 22 of the motor 20, respectively. The three switching element pairs are connected to coils 22 of U-phase, V-phase and W-phase, respectively.

The driver circuit 72 is connected to a gate terminal of each switching element of the power conversion circuit 71. The driver circuit 72 turns on the switching element by applying an on-signal (driving signal) to the gate terminal of the switching element. With the on-signal at the gate terminal, the switching element remains in an on-state. The switching element remains in an off-state when no on-signal is applied to the gate terminal.

The encoder detection circuit 73 is connected to the encoder 12. The encoder 12 outputs to the encoder detection circuit 73 pulse signals of A-phase and B-phase, which vary with the rotation angle, that is, angular position, of the motor 20 (rotor 23). The control circuit 80 detects the pulse signals of the encoder 12, which the encoder detection circuit 73 detected.

As described above, the encoder 12 is the incremental type, which outputs the pulse signal in response to the rotation of the motor 20. The control circuit 80 decreases (counts down) or increases (counts up) a count value (pulse signal count value) in response to the pulse signal outputted from the encoder 12. Thus the control circuit 80 detects a rotation state of the motor 20 (rotor 23). The control circuit 80 is capable of rotating the motor 20 at high rotation speeds without loss of synchronism by detecting the rotation state of the motor 20. Each time the power supply is turned on in the vehicle, that is, each activation of the shift-by-wire system 1, initial driving control is performed for learning a current supply phase of the motor 20, that is, synchronization between the current supply phase and the count value of the pulse signals outputted from the encoder 12. With this initial driving control, the rotation of the actuator 10 is controlled appropriately.

The current detection circuit 74 is connected to the power conversion circuit 71, for example, to detect currents flowing in the coils 22 and each of the switching elements of the power conversion circuit 71. That is, the current detection circuit 74 detects a current value, which corresponds to a driving current supplied when the motor 20 is driven. The current detection circuit 74 outputs a signal related to the detected current value to the control circuit 80.

The control circuit 80 is an integrated circuit such as a programmed microcomputer, for example. The control circuit 80 includes, as conceptual functional parts, a PWM control part 81, a rotation speed control part 82, a rotation angle detection part 83, a reference position learning part 84, a target angle calculation part 85, a current increase check part 86, a current minimum value storage part 87, a motor rotation stop part 88 and a reverse driving part 89. In the first embodiment, those functional parts 81 to 89 are realized by computer programs executed by the CPU of the microcomputer.

The PWM control part 81 detects a rotation position of the rotor 23 based on the pulse signals from the encoder detection circuit 73, calculates a PWM control value as a control value for PWM control of the motor 20 based on the detected rotation position and the like, and outputs the PWM control value to the driver circuit 72. The driver circuit 72 calculates the driving signal based on the PWM control value applied from the PWM control part 81 and outputs the calculated driving signal to each switching element of the power conversion circuit 71. Thus the on-off state of each switching element of the power conversion circuit 71 is controlled in correspondence to the driving signal.

The PWM control part 81 rotationally drives the motor 20 through the driver circuit 72 and the power conversion circuit 71 based on the calculated PWM control value. As the PWM control value applied to the driver circuit 72 increases, the driving current supplied to the motor 20 increases and the torque of the motor 20 increases. The rotation speed control part 82 variably controls the rotation speed of the motor 20 by controlling the PWM control value applied from the PWM control part 81 to the driver circuit 72. The rotation angle detection part 83 detects a present rotation angle, which is the rotation angular position of the motor 20 at present time. Specifically, the rotation angle detection part 83 detects the present rotation angle of the motor 20 based on the count value of the pulse signals applied from the encoder 12. The ECU 60 is connected electrically to a selector sensor 6 of the range selector 5 provided as a shift selection device.

The selector sensor 6 detects a range, which is referred to as a command range below, commanded by manipulation of the driver of the vehicle on the range selector 5. The selector sensor 6 outputs the detected signal to the control circuit 80 of the ECU 60.

The control circuit 80 determines a target range based on the signal related to the command range outputted from the selector sensor 6. More specifically, the target range is determined based on the signal from the selector sensor 6, a brake signal, a vehicle speed sensor signal and the like. The ECU 60 controls the rotation of the actuator 10 so that the shift range of the automatic transmission 3 is set to the determined target range. That is, the shift range is switched over to the target range by rotating the motor 20 to the target rotation position, which corresponds to the target range. Thus actual range of the automatic transmission 3 is switched over to a range, which the driver intends to set.

Since the encoder 12 is the incremental type, it is only possible to detect a relative rotation position of the motor 20 (rotor 23). For this reason, in switching over the shift range to a desired range by rotating the motor 20, it is necessary to learn a reference position, which corresponds to an absolute position of the motor 20 and match a limit position of a movable range (rotatable range) of the detent plate 32 and the reference position. After learning the reference position of the motor 20, the rotation position of the motor 20 corresponding to each shift range is calculated based on the learned reference position and a predetermined rotation value (control constant) and the motor 20 is rotated to attain the calculated rotation position. Thus the actual range is switched over to the desired shift range. The reference position learning part 84 of the ECU 60 learns the reference position of the motor 20, which corresponds to the end part (P-range or D-range) in the movable range of the detent plate 32.

After learning the reference position by the reference position learning part 84, the control circuit 80 of the ECU 60 indirectly detects the actual range at that time by calculation based on the learned reference position, the predetermined rotation value and the pulse signal count value (rotation position of the motor 20) applied from the encoder 12. The ECU 60 indicates actual range information on a display device 7, which is provided at a front position relative to a driver's seat in the vehicle. The driver is thus enabled to recognize the actual range from time to time. The actual range is detected based on the rotation position of the motor 20, when the center of the roller 35 is located within respective ranges of the recessed part 41, 42, 43 and 44 of the detent plate 32, which correspond to the shift ranges P, R, N and D.

For learning the reference position, the reference position learning part 84 rotates the motor 20 until the detent plate 32 stops at the limit position in the movable range, that is, position corresponding to the P-range or D-range. At this time, the reference position learning part 84 controls the motor 20 to be rotated at a relatively low constant speed by the rotation speed control part 82. It is thus possible to reduce impact shock generated when the detent plate 32 reaches the limit position in the movable range. The reference position learning part 84 learns the reference position of the motor based on the count value of the pulse signals of the encoder 12 at time when a predetermined time elapses after the motor 20 stopped rotating.

The reference position learning part 84 learns the reference position of the motor 20 by rotating the motor 20 until the detent plate 32 stops at the limit position in the movable range. The control related to learning of the reference position by the reference position learning part 84 is referred to as a reference position learning control. For the reference position learning control, the motor 20 is rotated so that the roller 35 hits the P-wall 411 of the recessed part 41 corresponding to the P-range or the D-wall 441 of the recessed part 44 corresponding to the D-range. The reference position learning control is referred to as a wall-hitting learning control or a pushing learning control below occasionally as well.

The control circuit 80 normally drives the rotor 23 to the target rotation position by supplying electric power to the coils 22 of the motor 20 while detecting the rotation position of the rotor 23 relative to the stator 21 based on the pulse signal count value of the encoder 12. That is, the control circuit 80 switches over the shift range to the target range by driving the motor 20 to rotate while feeding back the rotation state of the rotor 23 (motor 20). This control of the control circuit 80 is referred to as a normal driving control.

The target angle calculation part 85 calculates a target angle, which indicates a rotation angle of the motor 20, for switching over the shift range to the target range position. Specifically, the target angle calculation part 85 determines the target range based on the signal related to the command range outputted from the selector sensor 6 and sets as the target angle the rotation angle of the motor 20 corresponding to the determined target range. The current increase check part 86 performs checking processing about whether the current value detected by the current detection circuit 74 increased. The current minimum value storage part 87 updates and stores a current minimum value, which is a minimum value of the current value detected by the current detection circuit 74. The current increase check part 86 starts its check processing, when a difference between the target angle calculated by the target angle calculation part 85 and the present rotation angle actually detected by the rotation angle detection part 83 becomes equal to or smaller than a predetermined value.

Further, the current increase check part 86 determines that the current value has increased, when the current value detected by the current detection circuit 74 increased from the current minimum value stored in a current minimum value storage part 85 by a predetermined value or more. More specifically, the current increase check part 86 determines that the current value has increased, when a predetermined time elapses after the current value detected by the current detection circuit 74 increased from the current minimum value stored in the current minimum value storage part 85 by the predetermined value or more.

The motor rotation stop part 88 stops rotation of the motor 20 in response to the determination of the current increase check part 58 that the current value has increased. The reverse driving part 89 reverses the rotation direction of the motor 20 after the motor 20 is stopped from rotating by the motor rotation stop part 88 and then drives the motor 20 to rotate. The reverse driving part 89 drives the motor 20 to rotate a backlash angle, which is a predetermined angular interval within an angular range of backlash between the motor shaft 24 and the detent shaft 321, after reversing the rotation direction of the motor 20.

Figure 4:
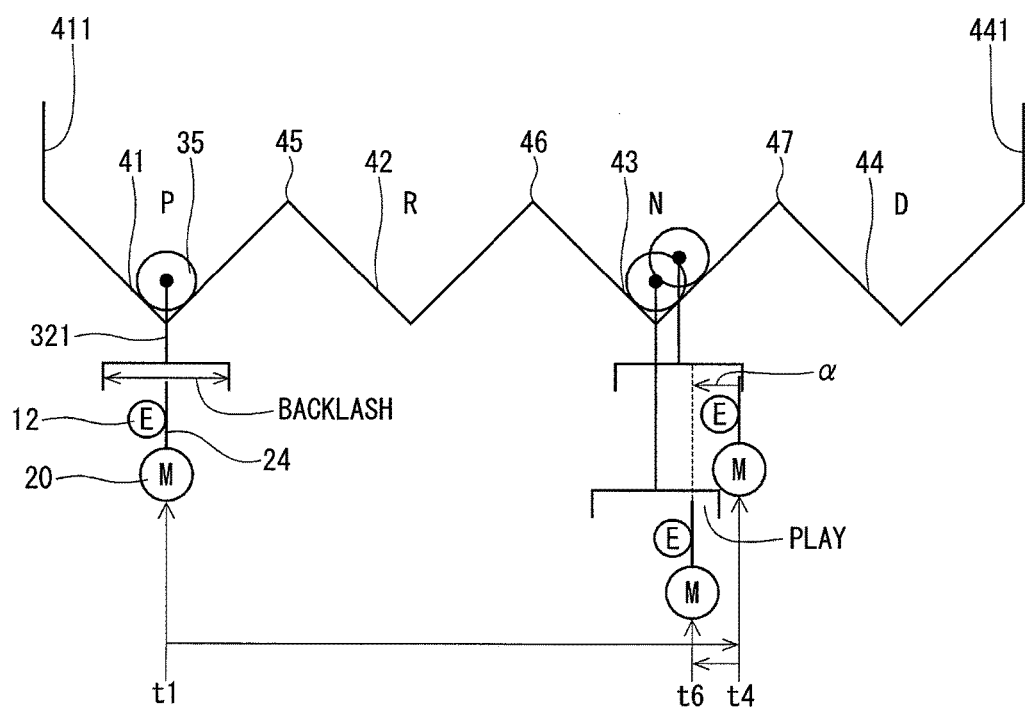
FIG. 4 is a schematic view showing one exemplary control performed by the shift range control apparatus according to the first embodiment.

One exemplary normal driving control performed by the control part in the present embodiment will be described below with reference to FIG. 4, FIG. 5A and FIG. 5B. When the target angle calculation part 85 calculates the rotation angle corresponding to the recessed part 43, which corresponds to the N-range, under a state that the roller 35 is located in the center of the recessed part 41 corresponding to the P-range at time t1 in FIG. 4, FIG. 5A and FIG. 5B, the control circuit 80 rotationally drives the motor 20 to thereby rotate the detent plate 32 in the forward direction. The roller 35 thus relatively moves toward the recessed part 43.

When the difference between the target angle calculated by the target angle calculation part 85, that is, the rotation angle corresponding to the recessed part 43 corresponding to the N-range, and the present rotation angle detected by the rotation angle detection part 83 becomes equal to or smaller than the predetermined value (Np in FIG. 5A and FIG. 5B) at time t2, the current increase check part 86 starts its check processing.

Figure 5A:
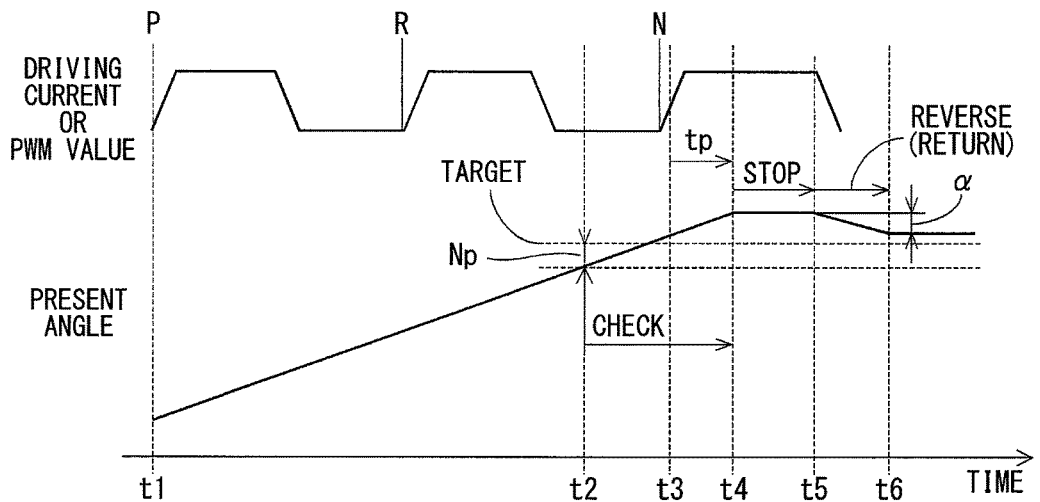
FIG. 5A is a timing chart showing one exemplary control performed by the shift range control apparatus according to the first embodiment.
Figure 5B:
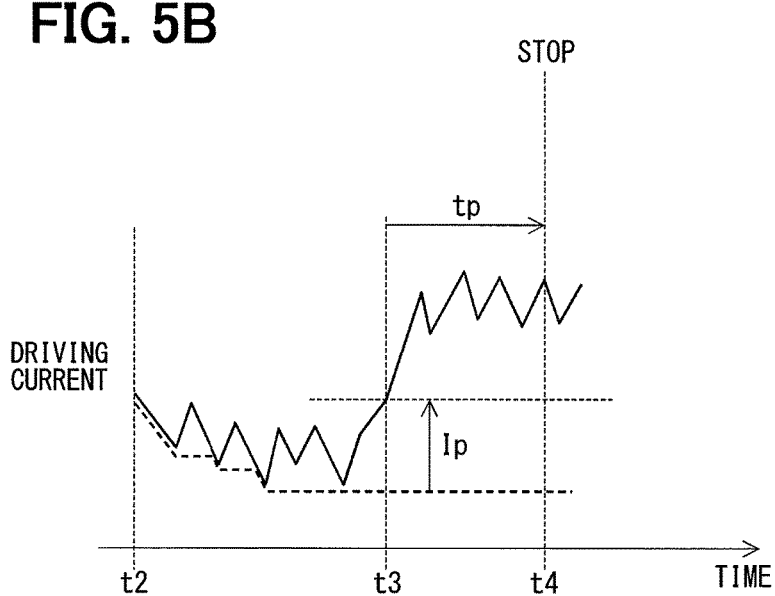
FIG. 5B is an enlarged view of a part of FIG. 5A.

When the current value detected by the current detection circuit 74 increases from the current minimum value stored in the current minimum value storage part 87 by the predetermined value (Ip in FIG. 5A and FIG. 5B) or more at time t3 and then the predetermined time (tp in FIG. 5A and FIG. 5B) elapses at time t4 as shown in FIG. 5B, the current increase check part 86 determines that the current value has increased. The motor rotation stop part 88 stops the motor 20 from rotating.

After the motor 20 is stopped from rotating by the motor rotation stop part 88 at time t5 as shown in FIG. 5A, the reverse driving part 89 reverses the rotation direction of the motor 20 and continues to rotationally drive the motor 20. The reverse driving part 89 rotationally drives the motor 20 to rotate the backlash angle α, which is the predetermined angle within the backlash between the motor shaft 24 and the detent shaft 321, after reversing the rotation direction of the motor 20. As a result, at time t6, the roller 35 is located in the center of the recessed part 43, which corresponds to the N-range, and a play is provided between the motor shaft 24 and the detent shaft 321 as shown in FIG. 4.

As described above, in the first embodiment, ECU 60 is configured to switch over the shift range by controlling the shift range switchover device 30, which includes the motor 20, the detent plate 32 and the detent spring 34. The ECU 60 includes the control circuit 80, the current detection circuit 74, the current increase check part 86, the motor rotation stop part 88 and the reverse driving part 89. The motor 20 includes the motor shaft 24, which outputs torque.

The detent plate 32 includes the detent shaft 321, which is connected to the motor shaft 24 and receives the torque from the motor 20, the plate part 322, which is formed to extend from the detent shaft 321 in the radially outward direction in the plate shape, and the recessed parts 41, 42, 43 and 44 formed at the outer peripheral part of the plate part 322.

The detent spring 34 includes the roller 35, which is pressed to the outer peripheral part of the plate part 322. The roller 35, when fitted in the recessed part 41, 42, 43 or 44, restricts the detent plate 32 from rotation and fixes the range position. The control circuit 80 switches over the shift range by controlling driving of the motor 20 to rotationally drive the detent plate 32. The current detection circuit 74 detects the current value, which corresponds to the driving current supplied when the motor 20 is driven. The current increase check part 86 checks whether the current value detected by the current detection circuit 74 has increased. The motor rotation stop part 88 stops the rotation of the motor 20 when the current increase check part 86 determines that the current value has increased. The reverse driving part 89 rotationally drives the motor 20 by reversing the rotation direction of the motor 20 after the motor rotation stop part 88 stopped the rotation of the motor 20.

As described above, according to the first embodiment, when the current increase check part 86 determines that the current value has increased, that is, when the roller 35 of the detent spring 34 runs onto a part of the protruded part 45, 46 or 47 and the like passing over the center of the recessed part 41, 42, 43 or 44 of the detent plate 34, the reverse driving part 89 reverses the rotation direction of the motor 20 and drives the motor 20 to rotate. Thus, the roller 35 is returned to the center side of the recessed part 41, 42, 43 or 44 and held in or near the center of the recessed part 41, 42, 43 or 44. It is thus possible to locate the detent plate 32 in position accurately.

According to the first embodiment, as described above, the reverse driving part 89 actively returns the roller 35 toward the center side of the recessed part 41, 42, 43 or 44 when the roller 35 passes by the center of the recessed part 41, 42, 43 or 44. For this reason, it is possible to locate the detent plate 32 in position accurately even in case that the DC brushless motor, the driven torque of which is large under no power supply, is used as the motor 20.

According to the first embodiment, the reverse driving part 89 drives the motor 20 to rotate the backlash angle α, which is the predetermined angle within the backlash between the motor shaft 24 and the detent shaft 321. Thus the roller 35 is pushed down accurately in the center of the recessed part 41, 42, 43 or 44, when the motor 20 is driven to rotate in reverse by the reverse driving part 89.

According to the first embodiment, the ECU 60 further includes the target angle calculation part 85 and the rotation angle detection part 83. The target angle calculation part 85 calculates the target angle, which is the rotation angle of the motor 20, for switching over the shift range to the target range position. The rotation angle detection part 83 detects the present rotation angle, which is the present angle of rotation of the motor 20. The control circuit 80 starts the check processing by the current increase check part 86, when the difference between the target angle calculated by the target angle calculation part 85 and the present rotation angle detected by the rotation angle detection part 83 becomes equal to or smaller than the predetermined value. For this reason, it is possible to start surely the check processing of the current increase check part 86 at the target angle, that is, at the recessed part corresponding to the target range. As a result, it is possible to suppress starting of the check processing at the recessed part, which corresponds to a range other than the target range.

According to the first embodiment, the ECU 60 further includes the current minimum value storage part 87. The current minimum value storage part 87 updates and stores the current minimum value, which is the minimum value of the current value detected by the current detection circuit 74. The current increase check part 86 determines that the current value has increased when the current value detected by the current detection circuit 74 increased from the current minimum value stored in the current minimum value storage part 87 by the predetermined value. It is thus possible to surely check by the current increase check part 86 whether the current value has increased.

According to the first embodiment, the motor 20 includes the rotor 23 rotatable with the motor shaft 24 and the magnets 25 provided on the rotor 23. That is, the motor 20 is the DC brushless motor. It is thus possible to accurately position the detent plate 32 at the target position and hence it is appropriate to use the DC brushless motor, the driven torque of which under not power supply is large, as the motor 20 for the shift range switchover device 30.

Second Embodiment

Figure 6A:
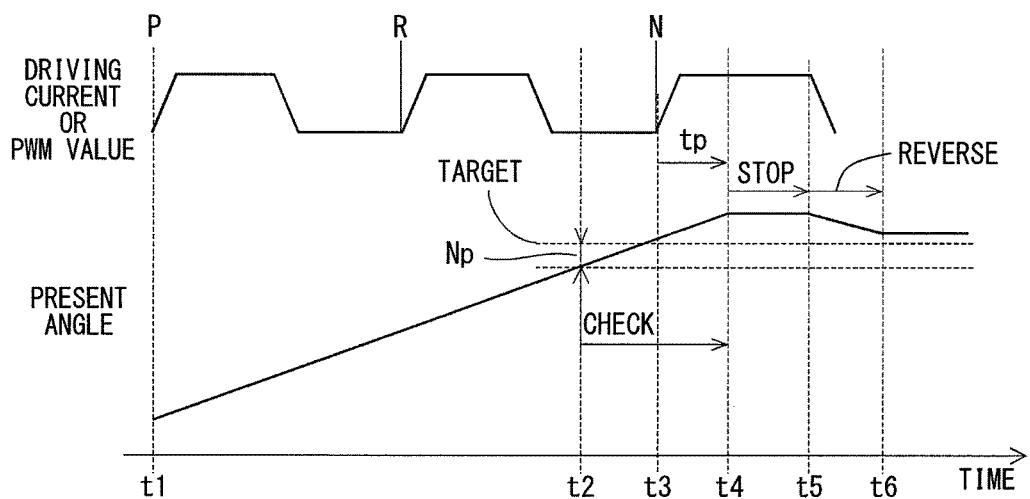
FIG. 6A is a timing chart showing one exemplary control performed by a shift range control apparatus according to a second embodiment.

The shift range control apparatus (ECU 60) according to a second embodiment will be described with reference to FIG. 6A and FIG. 6B. The second embodiment is different from the first embodiment in that the reverse driving part 89 controls the motor 20 in a different way.

In the second embodiment, the reverse driving part 89 reverses the rotation direction of the motor 20 and rotationally drives the motor 20 to rotate the same angle as the angle, which the motor 20 rotated in a delay time, which is from time the current value started to increase to time the current increase check part 86 determines that the current value has increased.

One exemplary operation of the normal driving control, which the control circuit 80 performs in the second embodiment, will be described with reference to FIG. 6A and FIG. 6B. In this example, it is assumed that the target angle calculation part 85 calculates as the target angle the rotation angle corresponding to the recessed part 43, which corresponds to the N-range. When the difference between the target angle, that is, rotation angle corresponding to the recessed angle 43 corresponding to the N-range, and the present rotation angle becomes equal to or smaller than the predetermined value at time t2 as shown in FIG. 6A, the current increase check part 86 starts the check processing.

Figure 6B:
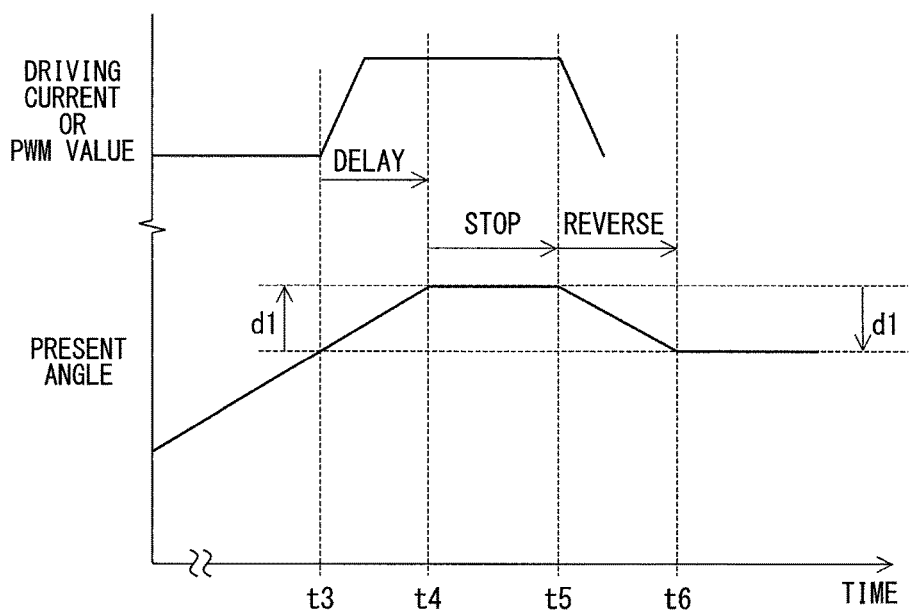
FIG. 6B is an enlarged view of a part of FIG. 6A.

As shown in FIG. 6B, the motor 20 rotates an angle d1 during the delay time, which is from time t3 of starting of increase of the current value to time t4 of determination of the current increase check part 86 that the current value has increased.

The reverse driving part 89 reverses the rotation direction of the motor 20 at time t5 and rotationally drives the motor 20 to make a rotation of the same angle d1 as the angular interval d1 made in the delay time. As a result, the roller 35 is located at the center in the recessed part 43, which corresponds to the N-range.

As described above, according to the second embodiment, the reverse driving part 89 reverses the rotation direction of the motor 20 and rotationally drives the motor 20 to rotate the same angle d1 as the angle d1, which the motor 20 rotated in the delay time, which is from the time the current value started to increase to the time the current increase check part 86 determines that the current value has increased. As a result, even in case that the backlash between the motor shaft 24 and the detent shaft 321 is small, it is possible to return the roller 35 to the center in the recessed part and locate the detent plate 32 in position accurately.

Third Embodiment

The shift range control apparatus (ECU 60) according to a third embodiment will be described with reference to FIG. 7. The third embodiment is different from the second embodiment in that the reverse driving part 89 controls the motor 20 in a different way.

In the third embodiment, the reverse driving part 89 reverses the rotation direction of the motor 20 and rotationally drives the motor 20 to rotate the same angle as the angle, which the motor 20 rotated in the delay time, which is from the time the current value started to increase to time the current increase check part 86 determines that the current value has increased, and additionally a backlash angle β, which is the predetermined angle within the range of backlash between the motor shaft 24 and the detent shaft 321.

One exemplary operation of the normal driving control, which the control circuit 80 performs in the third embodiment, will be described with reference to FIG. 7. In this example, it is assumed that the target angle calculation part 85 calculates as the target angle the rotation angle corresponding to the recessed part 43, which corresponds to the N-range.

Figure 7:
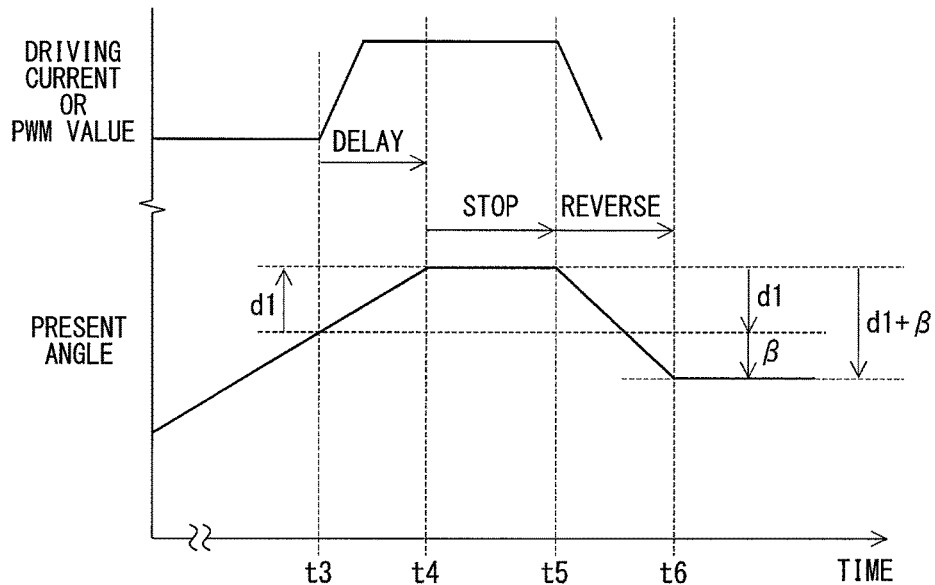
FIG. 7 is a timing chart showing one exemplary control performed by a shift range control apparatus according to a third embodiment.

As shown in FIG. 7, the reverse driving part 89 reverses the rotation direction of the motor 20 at time t5 and rotationally drives the motor 20 to make a rotation of the same angle d1 as the angle d1 made in the delay time, which is from time t3 the current value started to increase to time t4 the current increase check part 86 determines that the current value has increased, and additionally the backlash angle β, which is a predetermined angle within the range of backlash between the motor shaft 24 and the detent shaft 321. As a result, roller 35 is located at the center in the recessed part 43, which corresponds to the N-range, at time t6 and the play is provided between the motor shaft 24 and the detent shaft 321. In the third embodiment, the backlash angle β is predetermined to be an angle, which corresponds to one-half of the backlash between the motor shaft 24 and the detent shaft 321.

As described above, according to the third embodiment, the reverse driving part 89 reverses the rotation direction of the motor 20 and rotationally drives the motor 20 to make a rotation of the same angle d1 as the angle d1 made in the delay time, which is from the time the current value started to increase to the time the current increase check part 86 determines that the current value has increased, and additionally the backlash angle β, which is the predetermined angle within the range of backlash between the motor shaft 24 and the detent shaft 321. It is thus possible to improve robustness against variations in the rotation angle when the motor 20 is controlled by the reverse driving part 89.

According to the third embodiment, the backlash angle β is set to correspond to one-half of the backlash, which exists between the motor shaft 24 and the detent shaft 321. It is thus possible to suppress the reverse driving part 89 from returning the roller 35 excessively.

Fourth Embodiment

Figure 8:
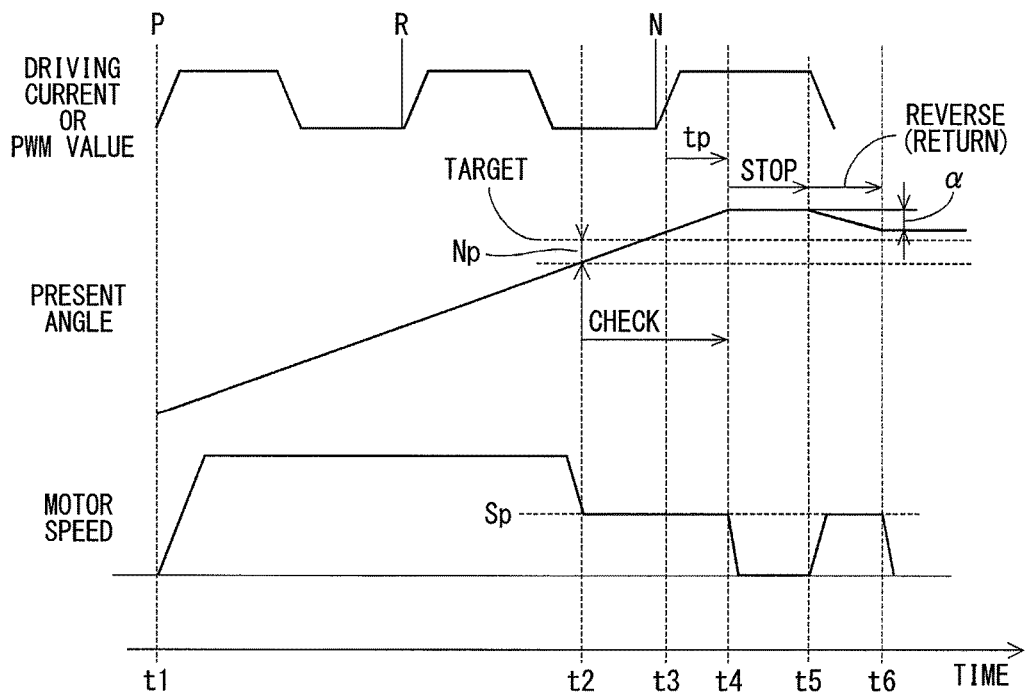
FIG. 8 is a timing chart showing one exemplary control performed by a shift range control apparatus according to a fourth embodiment.

The shift range control apparatus (ECU 60) according to a fourth embodiment will be described with reference to FIG. 8. The fourth embodiment is different from the first embodiment in that the motor 20 is controlled differently when the current increase check part 86 performs the check processing. In the fourth embodiment, when the current increase check part 86 performs the check processing, the rotation speed control part 82 controls the rotation speed of the motor 20 to a constant rotation speed, which is equal to or lower than a predetermined value Sp.

One exemplary operation of the normal driving control, which the control circuit 80 performs in the third embodiment, will be described with reference to FIG. 8. In this example, it is assumed that the target angle calculation part 85 calculates as the target angle the rotation angle corresponding to the recessed part 43, which corresponds to the N-range. As shown in FIG. 8, when the current increase check part 86 starts the check processing at time t2, the rotation speed control part 82 controls the rotation speed of the motor 20 to the constant speed, which is equal to or lower than the predetermined value Sp, that is a relatively low speed. In the fourth embodiment, also when the motor 20 is rotationally driven by the reverse driving part 89 after time t5, the rotation speed of the motor 20 is controlled to the constant rotation speed, which is equal to or lower than the predetermined value by the rotation speed control part 82.

As described above, the fourth embodiment includes the rotation speed control part 82, which controls the rotation speed of the motor 20. The rotation speed control part 82 controls the rotation speed of the motor 20 to the constant rotation speed equal to or lower than the predetermined value when the current increase check part 86 performs the check processing. It is thus possible to improve the accuracy of the checking processing of the current increase check processing 86 and restrict the roller 35 from moving to the recessed part, which corresponds to the other range, in the course of performing the check processing.

Other Embodiment

In the first embodiment, it is exemplified that the reverse driving part 89 rotationally drives the motor 20 to rotate the backlash angle α, which is the predetermined angle within the backlash between the motor shaft 24 and the detent shaft 321, after reversing the rotation direction of the motor 20. As the other embodiment, the backlash angle α, which is exemplified as the angle corresponding to one-half of the backlash, may be set to any angle, which corresponds to an angle within the range of the backlash.

In the embodiments described above, it is exemplified that the current increase check part 86 determines that the current value has increased when the predetermined value (time tp) elapses after the current value detected by the current detection circuit 74 increased more than the predetermined value (current Ip) from the current minimum value stored in the current minimum value storage part 87. As the other embodiment, the current increase check part 86 may determine that the current value has increased at a time point, at which the current value detected by the current detection circuit 74 increased by the predetermined value Ip or more from the current minimum value stored in the current minimum value storage part 87. Further, as the other embodiment, the current increase check part 86 may determine that the current value has increased at a time point, at which the current value detected by the current detection circuit 74 becomes equal to or higher than a predetermined value.

In the embodiments described above, it is exemplified that all of the PWM control part 81, rotation speed control part 82, rotation angle detection part 83, reference position learning part 84, target angle calculation part 85, current increase check part 86, current minimum value storage part 87, motor rotation stop part 88 and reverse driving part 89 are provided as functional parts of the control circuit 80, that is, all of the functions of those parts 81 to 89 are performed by execution of control programs. As the other embodiment, any one of the PWM control part 81, rotation speed control part 82, rotation angle detection part 83, reference position learning part 84, target angle calculation part 85, current increase check part 86, current minimum value storage part 87, motor rotation stop part 88 and reverse driving part 89 may be configured as a hardware part such as dedicated electronic circuits or the like.

In the embodiments described above, it is exemplified that the P-wall 411 of the recessed part 41 and the D-wall 441 of the recessed part 44 are configured in a shape, which does not allow the roller 35 to override even when the detent plate 32 rotates. As the other embodiment, the P-wall 411 and the D-wall 441 may be configured in a shape, which allows the roller 35 to override when the detent plate 32 rotates. In this modification, the movable range of the detent plate 32 is limited to be between two walls by providing such two walls, which contact both end parts of the detent plate 32 in the rotation direction and are capable of limiting the rotation of the detent plate 32. In the reference position learning control in this modification, the reference position is learned by pushing both ends of the detent plate 32 in the rotation direction to at least one of two walls.

In the embodiments described above, it is exemplified that the detent mechanism is formed of the plural recessed parts formed in the detent plate (driven target) provided on the manual shaft and the roller of the detent spring. As the other embodiment, the detent mechanism formed of plural recessed parts and the roller may be provided near the speed reduction device within the actuator, for example.

The number of the recessed parts may be any number. That is, the number of shift ranges of the automatic transmission, to which the shift range control apparatus (ECU 60) is applied, is not limited to four.

As the other embodiment, the shift range control apparatus may be applied to a continuously variable transmission (CVT), which switches over four positions of P, R, N and D similarly to the embodiments described above, or an automatic transmission of a hybrid vehicle (HV). Further, the shift range control apparatus may be applied to an electric vehicle (EV), in which two positions of P and non-P are switched over or to a range switchover of a parking mechanism of the hybrid vehicle. As the other embodiment, the motor may be a type, which has coils of four or more phases, for example.

In the embodiments described above, it is exemplified that the encoder for detecting the relative rotation position of the motor is the magnetic type encoder. As the other embodiment, the encoder may be an optical type or a brush type, for example. The encoder is exemplified to output the pulse signals of A-phase and B-phase. The encoder may, however, further output a Z-phase signal for use in correction (for indexing) in addition to the A-phase and B-phase. In place of the encoder, any other detection devices may be used as far as it is capable of detecting the rotation position of the motor. The shift range control apparatus described above should not be limited to the disclosed embodiments and modifications but may be further modified and varied.

What is claimed is:

1. A shift range control apparatus for switching over a shift range by controlling a shift range switchover device, which includes a motor, a detent plate and a detent spring, wherein
the motor has a motor shaft for outputting torque to rotationally drive the detent plate for a switchover of the shift range,
the detent plate includes a detent shaft, which is connected to the motor shaft to receive the torque from the motor, a plate part, which is formed to extend from the detent shaft in a radially outward direction in a plate shape, and plural recessed parts formed at an outer peripheral part of the plate part, and
the detent spring includes a roller, which is pushed to the outer peripheral part of the plate part, the roller restricts the detent plate from rotation and fixes the range position, when fitted in the recessed part,
the shift range control apparatus comprising:

a current detection part for detecting a current value, which corresponds to a driving current supplied to drive the motor;

a current increase check part for checking whether the current value detected by the current detection part increased to a predetermined value;

a motor rotation stop part for stopping rotation of the motor when the current increase check part determines that the current value has increased; and a reverse driving part for rotationally driving the motor by reversing a rotation direction of the motor after the motor is stopped from rotation by the rotation stop part.

2. The shift range control apparatus according to claim 1, wherein:

the reverse driving part reverses the rotation direction of the motor and rotationally drives the motor to make a rotation of a same angle as a rotation angle, which the motor rotated in a delay time, which is from time when the current value started to increase to time when the current increase check part determines that the current value has increased.

3. The shift range control apparatus according to claim 1, wherein:

the reverse driving part drives the motor to rotate a backlash angle, which is a predetermined angle within a range of backlash between the motor shaft and the detent shaft.

4. The shift range control apparatus according to claim 1, wherein:

the reverse driving part reverses the rotation direction of the motor and rotationally drives the motor to make a rotation of a same angle as a rotation angle, which the motor rotated in a delay time, which is from time when the current value started to increase to time when the current increase check part determines that the current value has increased, and additionally a backlash angle, which is a predetermined angle within a range of backlash between the motor shaft and the detent shaft.

5. The shift range control apparatus according to claim 3, wherein:

the backlash angle is set to an angle, which corresponds to one-half of the backlash.

6. The shift range control apparatus according to claim 1, further comprising:

a target angle calculation part for calculating a target angle, which is a rotation angle of the motor, for switching over the shift range to a target range position; and a rotation angle detection part for detecting a present rotation angle, which is a present angle of rotation of the motor, wherein the current increase check part starts check processing when a difference between the target angle and the present rotation angle becomes equal to or smaller than a predetermined value.

7. The shift range control apparatus according to claim 1, further comprising:

a current minimum value storage part for updating and storing a current minimum value, which is a minimum value of the current value detected by the current detection part, wherein the predetermined value is set variably in correspondence to the current minimum value stored in the current minimum value storage part.

8. The shift range control apparatus according to claim 1, further comprising:

a rotation speed control part for controlling a rotation speed of the motor, wherein the rotation speed control part controls the rotation speed of the motor to a constant rotation speed equal to or lower than a predetermined speed value when the current increase check part performs the check processing.

9. The shift range control apparatus according to claim 1, wherein:

the motor further has a rotor, which is rotatable with the motor shaft and permanent magnets fixed to the rotor.

10. The shift range control apparatus according to claim 4, wherein:

the backlash angle is set to an angle, which corresponds to one-half of the backlash.

11. The shift range control apparatus according to claim 1, further comprising:

the current increase check part determines that the current value increased to the predetermined value after an elapse of a predetermined time from when the current value is detected by the current detection part reached the predetermined value.

* * * * *